(12) United States Patent
Jeter et al.

(10) Patent No.: US 12,444,474 B2
(45) Date of Patent: Oct. 14, 2025

(54) VOLTAGE RAMP MEMORY CALIBRATION

(71) Applicant: Apple Inc., Cupertino, CA (US)

(72) Inventors: Robert E. Jeter, Santa Clara, CA (US); Jingkui Zheng, Sunnyvale, CA (US); Srinivasa Rao Masanam, Cedar Park, TX (US)

(73) Assignee: Apple Inc., Cupertino, CA (US)

( * ) Notice: Subject to any disclaimer, the term of this patent is extended or adjusted under 35 U.S.C. 154(b) by 79 days.

(21) Appl. No.: 18/525,088

(22) Filed: Nov. 30, 2023

(65) Prior Publication Data

US 2025/0104790 A1 Mar. 27, 2025

Related U.S. Application Data

(60) Provisional application No. 63/584,429, filed on Sep. 21, 2023.

(51) Int. Cl.
*G11C 7/22* (2006.01)
*G11C 29/12* (2006.01)
*G11C 29/46* (2006.01)

(52) U.S. Cl.
CPC ........ *G11C 29/12015* (2013.01); *G11C 7/222* (2013.01); *G11C 29/1201* (2013.01); *G11C 29/46* (2013.01)

(58) Field of Classification Search
CPC .......... G11C 29/12015; G11C 29/1201; G11C 29/46; G11C 29/023; G11C 29/028
See application file for complete search history.

(56) References Cited

U.S. PATENT DOCUMENTS

| | | | |
|---|---|---|---|
| 10,795,425 B2 | 10/2020 | Hanson et al. | |
| 10,804,906 B2 | 10/2020 | Penzes et al. | |
| 11,556,164 B2 | 1/2023 | Ware et al. | |
| 2024/0211151 A1* | 6/2024 | Jeter | G11C 7/1057 |

* cited by examiner

*Primary Examiner* — Jay W. Radke
(74) *Attorney, Agent, or Firm* — DICKINSON WRIGHT RLLP

(57) ABSTRACT

An apparatus for performing memory calibrations during a performance state change is disclosed. A memory controller is configured to convey a clock signal to a memory and includes a calibration control circuit configured to perform a plurality of calibrations of the clock signal during a change from a first one to a second one of a plurality of performance states, and a delay circuit configured to apply a delay to clock signal conveyed to the memory. In performing a one of the calibrations, the calibration control circuit is configured to convey, to the memory, a first command to begin a timing test that generates a count value indicative of a current voltage of the memory, receive the count value from the memory at a conclusion of the timing test, and cause the delay circuit to adjust, based on the count value, the delay applied to the clock signal.

20 Claims, 9 Drawing Sheets

VOLTAGE RAMP MEMORY CALIBRATION

PRIORITY CLAIM

The present application claims priority to U.S. Provisional App. No. 63/584,429 entitled "Voltage Ramp Memory Calibration," filed Sep. 21, 2023, the disclosure of which is incorporated by reference herein in its entirety.

BACKGROUND

Technical Field

This disclosure is directed to memory subsystems, and more particularly, calibrations performed in memory subsystems.

Description of the Related Art

Eye patterns, or eye diagrams, are graphic illustrations that illustrate times and amplitudes at which a digital signal can be sampled at its correct value. In various types of systems that include data transmissions, it is desirable to sample signals (e.g., data signals synchronized by a clock signal) near a center of an eye, in terms of time and sampling voltage. In terms of timing, this can provide a signal with a sufficient amount of both setup and hold time, while also rendering it less susceptible to noise. In terms of voltage, this can enable a more accurate determination of a logic value (e.g., logic 1 or logic 0) based on a reference voltage used to distinguish one from the other.

In memory subsystems, calibrations may be performed to determine the points at which signals are sampled within the eye pattern. Calibrations are performed to determine an eye diagram that enables accurate sampling of signals, and thus include calibrations based both on the timing (sometimes referred to as a horizontal calibration) and sampling reference voltage (sometimes referred to as a vertical calibration). Performing these calibrations typically includes adjusting a number of different parameters that govern transmission of data between a memory controller and a memory. These parameters include a delay applied to a data strobe signal.

SUMMARY

An apparatus for performing memory calibrations during a performance state change is disclosed. In one embodiment, a memory controller is configured to convey a clock signal to a memory. The memory controller includes a calibration control circuit configured to perform a plurality of calibrations of the clock signal during a change from a first one of a plurality of performance states to a second one of the plurality of performance states, and a delay circuit configured to apply a delay to and convey the clock signal to the memory. In performing a given one of the plurality of calibrations, the calibration control circuit is configured to convey, to the memory, a first command to begin a timing test that generates a count value indicative of a voltage and temperature of the memory, receive the count value from the memory at a conclusion of the timing test, and cause the delay circuit to adjust, based on the count value, the delay applied to the clock signal.

BRIEF DESCRIPTION OF THE DRAWINGS

The following detailed description makes reference to the accompanying drawings, which are now briefly described.

DETAILED DESCRIPTION OF EMBODIMENTS

Figure 1:
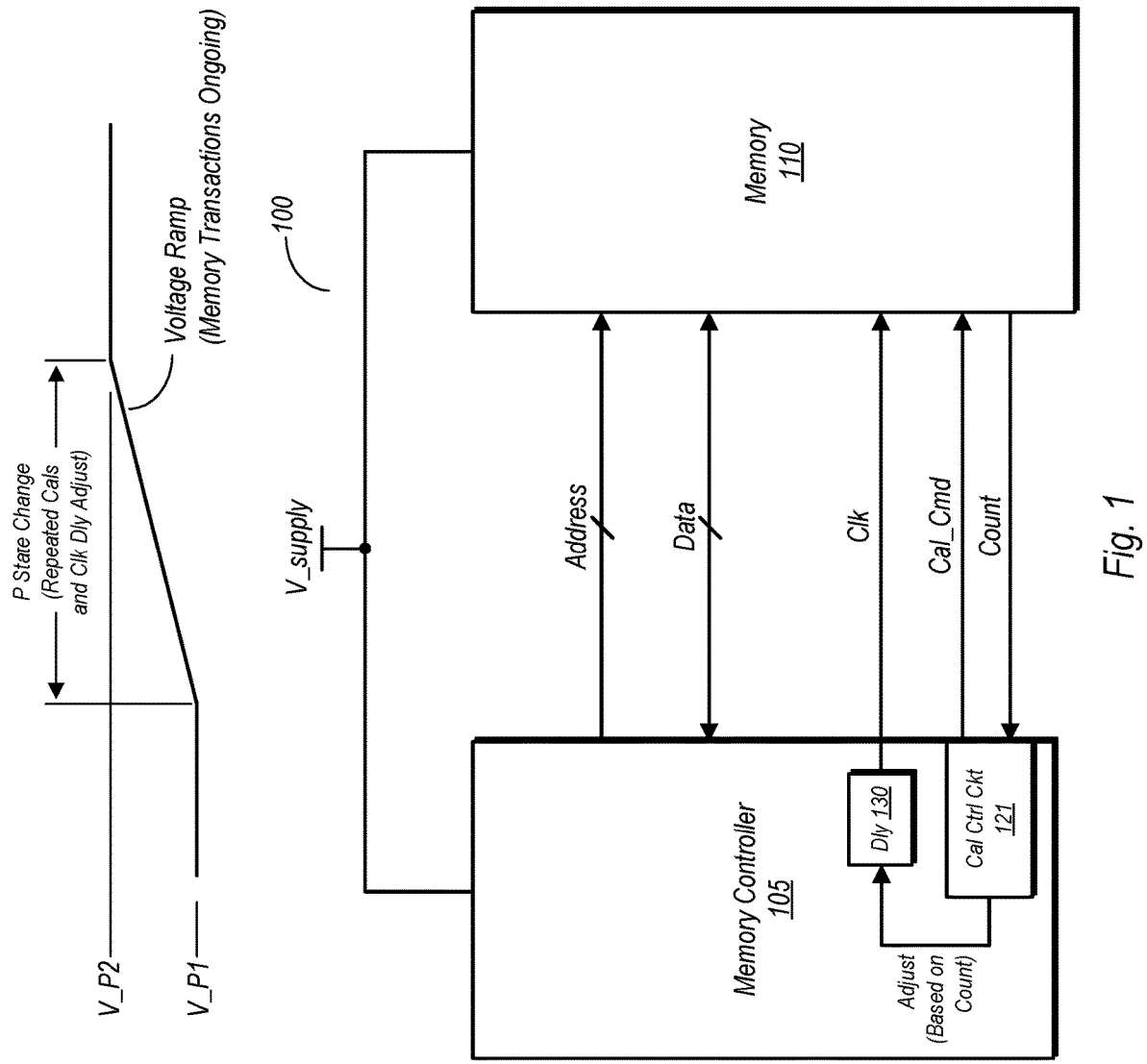
FIG. 1 is a block diagram of one embodiment of a memory subsystem.

Computer systems, and their corresponding memory systems, typically operate in a number of different performance states. A performance state comprises an operating (or supply) voltage and a clock frequency. When higher performance is needed, the supply voltage and clock frequency are increased. Conversely, when lower performance can be tolerated or minimization of power consumption is prioritized, the supply voltage and clock frequency are decreased. In conjunction with changing the voltage and the frequency, the timing of various clock signals (such as the write clock signal) may be scaled with the voltage in order that operation can begin in the new performance state without having to perform a calibration immediately. In some modern systems, the amount the voltage is scaled, or incremented, during a performance state change has increased (e.g., from 30 mV to 100 mV). However, with these larger increment sizes, the timing of the clock signals cannot be as easily scaled.

For many calibrations, memory traffic is suspended. Furthermore, memory traffic may be suspended during performance state changes, particularly during a voltage ramp. However, certain calibrations may be performed during these times without either delaying the voltage ramp or suspending traffic for the full duration of the calibration. For example, a background calibration routine can be run using a ring oscillator on the memory side. The ring oscillator increments a counter, which in turn returns a code corresponding to the count. The frequency of a signal generated by the ring oscillator, and thus the count, changes with the supply voltage, as well as with the temperature. The count value may be used to scale a delay provided to, e.g., a write clock signal.

Accordingly, the present disclosure contemplates performing such a background calibration during the change in voltage. A memory controller according to the present disclosure is configured to, during a change of a supply voltage from a first value to a second value, initiate the background calibration by sending a command to a memory, which includes a ring oscillator. In response to receiving the command, a timing test is conducted in which a count value is generated on the memory side and conveyed back to the memory controller. The memory controller then, based on the received count value, adjusts a delay provided to the clock signal. This may be repeated a number of times as the voltage ramps to the new value.

The ring oscillator on the memory side increments a counter for a certain amount of time concurrent with the voltage change. A frequency of an output signal generated by the ring oscillator may be voltage dependent, increasing as the voltage increases and vice versa. After the ring oscillator increments the counter for a particular iteration, the counter returns the count value to, e.g., a calibration control circuit on the memory controller side. A delay provided to a clock signal, such as a write clock, may be adjusted based on the count value. In one embodiment, the calibration control circuit may calculate a difference between the present count value and the most recent previous count value, and use this difference to adjust the delay. For example, if the value of the difference is 10% between the most recent count value and the previous count value, the delay applied to the write clock is also changed by this amount. As noted above, this may be performed several times during the ramping of the voltage. Iterations of the background calibration may continue to be conducted until the supply voltage has stabilized at its new value.

The background calibration of the present disclosure may allow for the occurrence of normal memory traffic during a significant portion of the time that the voltage is ramping up with larger voltage increments, with the memory traffic being blocked primarily during the adjusting of the delay. This is only a small portion of the time the voltage is ramping. This also allows entry into the new performance state without having to immediately perform a calibration, while also increasing performance by increasing the amount of time the memory is available for normal transactions.

Various embodiments of a memory subsystem capable of carrying out the background calibration of the present disclosure are now discussed in further detail. The discussion begins with the illustration of various details of a memory controller and a memory subsystem as illustrated in the block diagrams of FIGS. 1-3. A timeline for carrying out a background calibration according to one embodiment of the disclosure is discussed with reference to FIG. 4. Methods of carrying out a background calibration are described in further detail with reference to FIGS. 5 and 6. With reference to FIG. 7, a device which may implement the memory controller of the present application is discussed. Various applications of an integrated circuit that includes the memory controller of the present disclosure are described with reference to FIG. 8. A computer readable medium and fabrication system capable of manufacturing a circuit including the memory controller of the present application are discussed with reference to FIG. 9.

Memory Controller and Memory Subsystem:

FIG. 1 is a block diagram of one embodiment of a memory subsystem. In the embodiment shown, memory subsystem 100 includes a memory controller 105 and a memory 110, both of which are coupled to receive a supply voltage, V_supply. It is noted that the memory controller 105 as shown here may be implemented on an integrated circuit that is separate from one or more integrated circuits that implement the memory. For example, memory controller 105 may be one of one or more memory controllers implemented on a system-on-a-chip (SoC), while memory 110 may be implemented on a memory module in a system, the memory module having one or more integrated circuits. Furthermore, while both memory controller 105 and 110 are shown here as receiving a common supply voltage from the same source, embodiments are possible and contemplated where memory controller 105 receives a supply voltage separately from memory 110.

Memory controller 105 in the embodiment shown is configured to conduct memory transactions with memory 110. This can include reading data from memory and writing data to memory. Accordingly, data signals (Data) can be conveyed in either direction between memory controller 105 and memory 110. Memory controller 105 is also configured to generate and convey address signals (Address) to memory 110 on both read and write transactions. The transmission of data between memory controller 105 and memory 110 may be synchronized by at least one clock signal (Clk) as shown here. In some embodiments, multiple clock signals, such as a read data strobe (to synchronize reads from memory) and a write data strobe (to synchronize writes to memory) are provided. Although not explicitly shown here, memory controller 105 in various embodiments may convey other signals to memory 110, such as enable signals, bank select signals, read and write signals, and so on.

Memory controller 105 in the embodiment shown includes a calibration control circuit 121 configured to carry out various calibrations related to the transmission of signals to and from memory 110. These calibrations include a calibration of the clock signal, and more particularly, a delay applied to the clock signal in order to ensure sufficient margins in, e.g., setup and hold time for signals conveyed between memory controller 105 and memory 110. Some of these calibrations may involve operations on the memory side beyond reading and/or writing data, and are discussed in further detail below.

Memory subsystem 100 in the embodiment shown is capable of operating in a number of different performance states. Each performance state may include a unique combination of a supply voltage and a clock frequency, and may be chosen based on performance requirements and/or power consumption specifications. Generally speaking, performance states requiring higher performance may have higher supply voltages and clock frequencies, while performance states that prioritize the conservation of power may have lower supply voltages and lower clock frequencies.

When changing performance states, the voltage may be changed separately from the clock frequency. For example, when moving to a performance state optimized for higher performance, the supply voltage may be increased first, followed by a frequency change after the supply voltage has stabilized. When changing to a lower performance state, this order may be reversed.

Changing of the voltage may involve ramping up the voltage over time rather than simply switching from the first voltage to the second voltage. As shown in the example given, a transition from a first supply voltage V_P1 (corresponding to a first performance state) to a second, greater supply voltage V_P2 (corresponding to a second performance state) may occur as a ramp up over time. This change in voltage however, can affect the timing of the clock signal, Clk, that is used to synchronize transactions of data occurring between memory controller 105 and the memory 110. Accordingly, memory controller 105 in the embodiment shown is configured to initiate and complete calibrations of the clock signal, and more particularly, a delay provided thereto, during the ramp of the voltage between V_P1 and V_P2. By performing this calibration during the ramping of the voltage, normal memory transactions (reads from or writes to memory based on requests generated by other circuits external to memory controller 105) may be available during the voltage ramp.

In the embodiment shown, memory controller 105 is configured to initiate a calibration as the voltage begins ramping between V_P1 and V_P2, by sending a calibration command (Cal_Cmd) to memory 110. On the memory side, this may cause a count value to be generated by, e.g., a counter circuit, which is then conveyed back to calibration control circuit 121. In one embodiment, the generation of the count value may be carried out by using an output of a ring oscillator to increment a counter circuit. In particular, the output signal of the ring oscillator may be used to increment the counter circuit. Since the frequency of the ring oscillator output signal is voltage-dependent, higher voltages correspond to higher count values. The counter circuit is allowed to increment for a specified time, after which the count value is returned to calibration control circuit 121. In response to receiving the count value, calibration control circuit may use the value to adjust an amount of delay provided by delay circuit 130 to the clock signal. In one embodiment, this may be accomplished by calibration control circuit 121 calculating a difference between a currently received count value and a most recent previous count value, and adjusting the delay based on this difference.

The calibration procedure carried out during the ramping of the supply voltage from V_P1 to V_P2 may be performed a number of times during the change. Iterations of this calibration procedure may begin as soon as the supply voltage begins changing from V_P1, and may continue until the voltage has fully stabilized at V_P2. Since the delay applied to the clock signal may be adjusted with each iteration of the calibration, normal memory transactions may continue occurring during at least a portion of the voltage ramp, thereby preventing the memory 110 from being completely unavailable during the performance state change.

Figure 2:
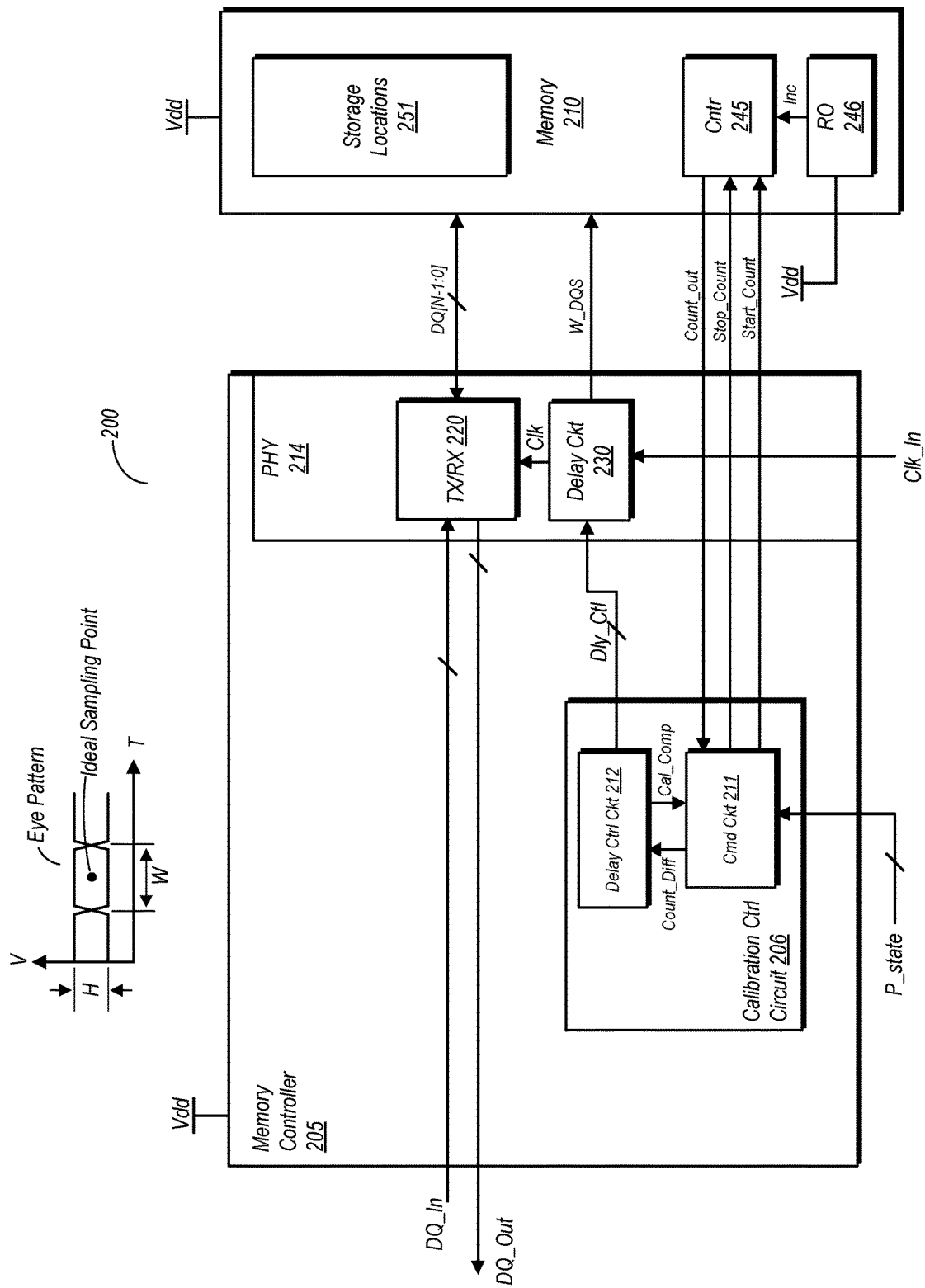
FIG. 2 is a block diagram of another embodiment of a memory subsystem.

FIG. 2 is a block diagram of another embodiment of a memory subsystem. In the embodiment shown, memory controller 205 includes a calibration control circuit 206 and a physical interface circuit 214. Calibration control circuit 206 includes a command circuit 211, and a delay control circuit 212. Physical interface 214 includes a transceiver 220, which is configured to transmit data, (DQ[N−1:0]) to memory 210 and receive data therefrom, as well as to transmit data to and receive data from a data bus external to memory controller via which other circuits (e.g., processor cores) may send and receive data corresponding to memory requests. Physical interface 214 also includes a delay circuit 230 coupled to receive an input clock signal (Clk_In) and further configured to output a clock signal to transceiver 220 as well as a write data strobe (W_DQS) to memory 210. Delay circuit 230 may be implemented in one embodiment using a delay locked loop (DLL), that may receive a code (in the form of the Dly_Ctrl signals) that configures the circuit to generate the desired delay. However, other types of delay circuits are possible and contemplated, and any suitable delay circuitry may be used.

It is noted that the use of the write data strobe in FIG. 2 is by way of example, but is not intended to be limiting to the type of clock signal conveyed to memory 210 or subject to the calibration of the present disclosure.

Memory 210 in the embodiment shown includes storage locations 251 in which data may be stored. In various embodiments, memory 210 may comprise a number of integrated circuits implemented on a memory module, although embodiments in which the components of memory 210 are implemented on a single integrated circuit are also possible and contemplated. Memory 210 in the embodiment shown also includes a counter circuit 245 and a ring oscillator 246, the latter of which is configured to generate a periodic output signal (Inc) that is provided to the former. In one embodiment, ring oscillator 246 may be implemented with, e.g., an odd number of series-coupled CMOS inverters, although any suitable circuitry for generating its output signal may be used. Ring oscillator is coupled to receive a supply voltage Vdd, with the frequency of the output signal Inc being dependent on the particular voltage at a given time. In the embodiment shown, a frequency of the output signal from ring oscillator 246 may increase as Vdd is increased and decrease as Vdd is decreased (e.g., during changes from one performance state to another).

Calibration control circuit 206 in the embodiment shown is configured to initiate and/or carry out various calibrations, including the calibration of the clock signal and the write data strobe per the disclosure. In particular, calibration control circuit 206 in the embodiment shown may initiate a calibration in which the delay applied to the write data strobe (and more generally any clock signal) which is carried out largely in the background during a performance state change. In the embodiment shown, calibration control circuit 206 may receive a P_state control signal, which may comprise a number of bits. This signal may be used, among other things, to indicate that a performance state change has been initiated, with the performance state change involving a change of the supply voltage Vdd.

In response to receiving an indication of a performance state change, command circuit 211 may generate and send a start count command to counter 245. In response to receiving the start count command, counter circuit 245 may begin incrementing in accordance with the periodic signal received from ring oscillator 246. After some specified amount of time has elapsed from the sending of the start count command, command circuit 211 may transmit a stop count command to counter circuit 245. In response to receiving the stop count command, counter circuit 245 may discontinue incrementing and sent the count value (Count_out) back to command circuit 211. After sending the count value, counter circuit 245 may reset itself and wait for the next start count command.

Command circuit 211 in the embodiment shown, upon receiving the count value from counter circuit 245, may calculate a difference between this value and a most recent previous count value. This difference, Count_Diff, is then forward to delay control circuit 212. Based on the difference, delay control circuit 212 adjusts the delay provided by delay circuit 230 through the use of the delay control signals (Dly_Ctl), and then send an indication (Cal_Comp) that the calibration cycle is complete. After receiving the indication, command circuit 211 may once again convey the Start_Count signal to counter circuit 245 to begin another iteration of the calibration. Iterations may be repeated until the P_State signals indicate that the supply voltage Vdd has stabilized at the new level commensurate with the performance state being entered.

In performing the repeated iterations of the calibration described above, a sampling point in an eye pattern may be maintained such that sufficient voltage and timing margins are present during the voltage ramp. An example of an eye pattern with an ideal sampling point is shown in FIG. 2, with this sampling point being near the center of the eye. A width of the eye runs along a horizontal time axis, while the height of the eye runs along a vertical voltage axis. Ideally, the eye will be sampled near the center, where voltage and timing margins are maximized. However, as operating conditions change, the margins may also change absent any adjustments. Accordingly, the calibrations carried out here may move the sampling point as conditions change to maintain sufficient voltage and timing margins until the change to the new voltage is complete, It is noted that in some embodiments, after the voltage change is complete, with the voltage having stabilized at the new value, a frequency change to a clock signal of the performance state may also be carried out. Additional calibrations other than those discussed here may be performed to ensure voltage and timing margins are sufficient after the frequency change.

Figure 3:
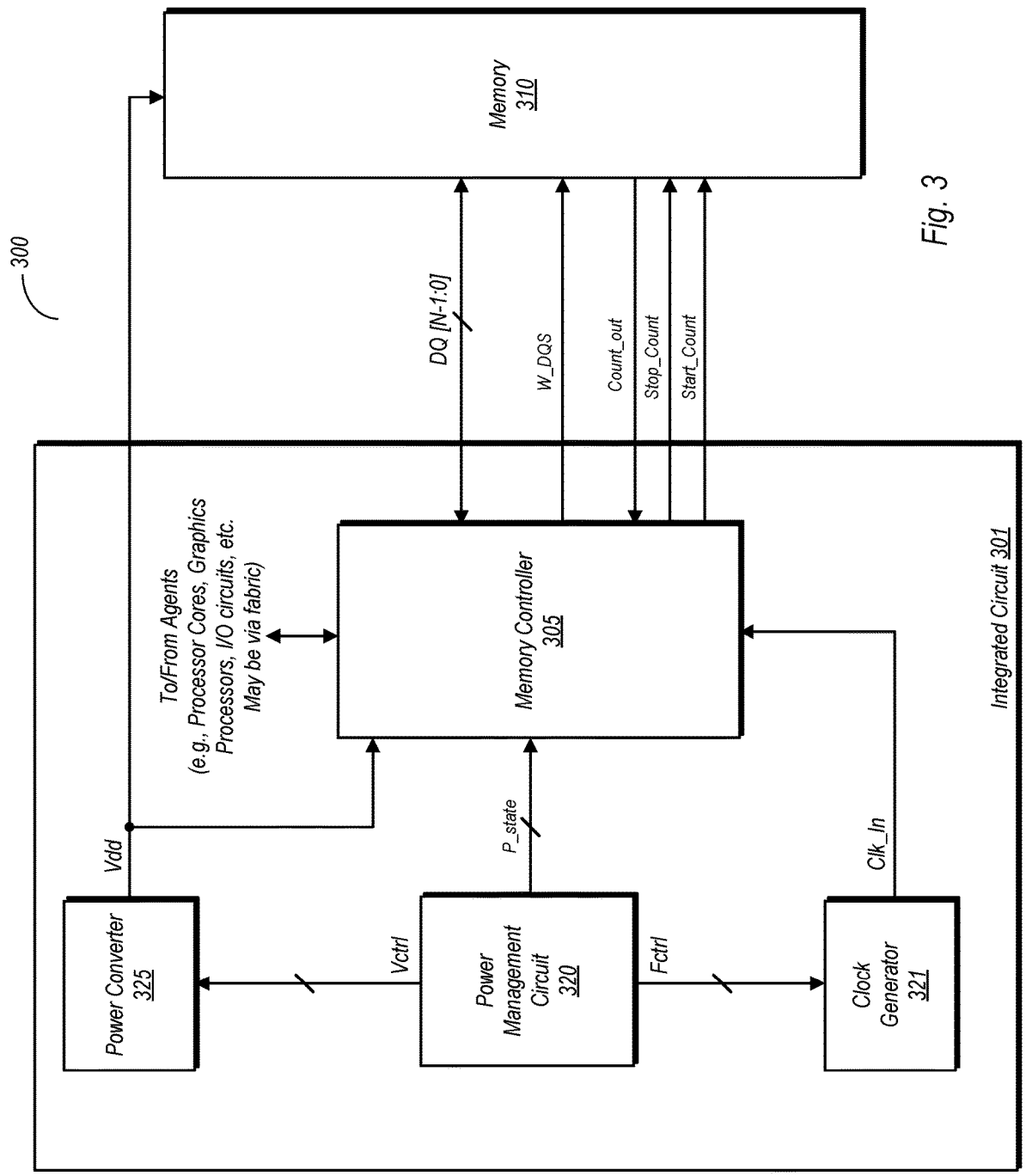
FIG. 3 is a block diagram of one embodiment of a system including a memory controller implemented on an integrated circuit.

FIG. 3 is a block diagram of one embodiment of a system including a memory controller implemented on an integrated circuit. In the embodiment shown, memory controller 305, power management circuit 320, clock generator 321, and power converter 325 are implemented on integrated circuit 301, while memory 310 is implemented separately therefrom.

Memory controller 305 in the embodiment shown may implement calibration functionality similar to that which is discussed above with reference to FIG. 2. This includes circuitry for generating the Start_Count and Stop_Count commands, receiving the count value (Count_Out), and generating a delay applied to a data strobe signal W_DQS. Data signals DQ [N−1:0] may be conveyed between memory controller 305 and memory 310 during operation of system 300. Memory controller 305 may be coupled to a number of other functional circuit blocks/agents implemented on integrated circuit 301 (not shown here), including processor cores, graphic processor circuits, I/O circuits, and so on. Communications from other agent circuit on integrated circuit 301 may, in some embodiments, be conducted over a communications fabric.

Memory 310 in the embodiment shown may be configured similarly to that of memory 210 of FIG. 2. Accordingly, memory 310 may include a number of storage locations implemented across one or more integrated circuits (which may in turn be implemented on a memory module, a small printed circuit board having a number of memory chips soldered thereto). Memory 310 may also include a ring oscillator and a counter similar to the embodiments discussed above to enable the carrying out of calibrations in accordance with this disclosure.

Power converter 325 in the embodiment shown may be any suitable type of circuitry for generating the regulated supply voltage Vdd. In one embodiment, power converter 325 may be a switching power converter, and may further be a multi-phase power converter configured to add or shed operating phases based on the current demanded by its loads (memory controller 305 and memory 310 in this case). Other types of power converters (e.g., such as linear voltage regulators) are also possible and contemplated. Although shown as implemented on integrated circuit 301, embodiments are possible and contemplated in which the power supply to memory controller 305 and memory 310 is implemented external to both. Furthermore, embodiments are possible and contemplated in which separate power supplies are provided for memory controller 305 and memory 310. In such embodiments, the voltages of these power supplies may track one another such that both memory controller 305 and memory 310 operate at approximately the same supply voltage.

Clock generator 321 in the embodiment shown may include any suitable clock signal generation circuitry. Such circuitry may include a oscillators such as an inductive-capacitive (LC) tank circuit oscillator or other circuit for generating a base periodic signal. In some embodiments, a crystal oscillator may be implemented external to integrated circuit 301, but provide a periodic signal to clock generator 321 used to generate other clock signals, including the Clk_In signal provided to memory controller 305. Irrespective of the source, a base clock signal may be generated that is, unlike the ring oscillator output signal discussed above, substantially insensitive to voltage changes during operation.

Clock generator 321 may also include other circuits usable to adjust a frequency of the Clk_In signal (and other clock signals output therefrom). Such circuitry may include clock multiplier circuits, clock divider circuits, delay locked loops, and so on. These circuits may be adjustable during operation to change the frequency of their respectively output clock signals.

Power management circuit 320 in the embodiment shown may carry out various power management functions, including adjusting of the performance state of circuits such as memory controller 305. Power management circuit 320 may utilize voltage control signals (Vctrl) to cause power converter 325 to change its output voltage and current capacity during a performance state change. In causing a change to the output voltage of power converter 325, power management circuit 320 may cause this change to be gradual by ramping the voltage up or down from the voltage of the old performance state to that of the new performance state.

Power management circuit 320 may also carry out actions to adjust the frequency of the Clk_In signal output from clock generator 321. Such signals may cause a multiplier circuit to increase the frequency of the Clk_In signal or a divider to reduces its frequency such that its value is set to that of its designated performance state.

In changing the performance state, power management circuit 320 may also send a multi-bit signal P_state to memory controller 305. This multi-bit signal may indicate when the performance state change is beginning as well as when it has completed.

Figure 4:
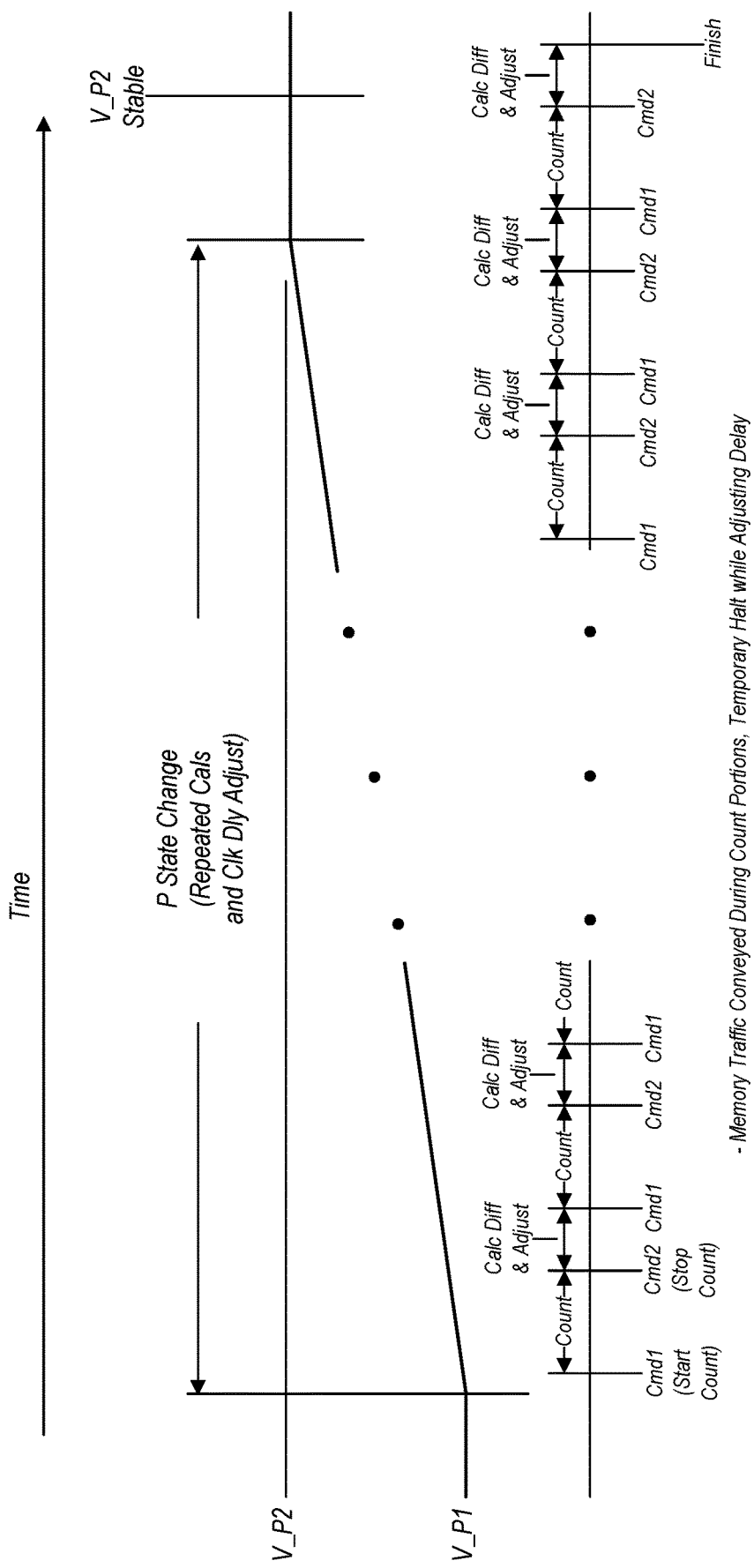
FIG. 4 is an illustration of a calibration timeline for calibrations carried out by one embodiment of a memory controller according to the disclosure.

Calibration Timeline:

FIG. 4 is an illustration of a timeline for calibrations carried out by one embodiment of a memory controller according to the disclosure. In the illustrated example, the voltage at the beginning of the timeline, V_P1, corresponds to a first performance state. As the voltage begins ramping up toward V_P2 of the target performance state, a first command, (Cmd1, Start Count), is generated and sent by a memory controller to cause counting to commence on the memory side. This continues until the counter receives a second command (Cmd2, Stop Count) from the memory controller (embodiments in which the counter is stopped after a pre-programmed number of clock cycles are also possible and contemplated). In response, the count value is conveyed back to the memory controller, which calculates a difference between the current and most recent previous count values. Based on this difference, an adjustment to the delay of a clock signal (e.g., a write data strobe) is carried out, after which the first command is issued again.

This process continues as the voltage ramps up from V_P1 to V_P2. During at least the portion where the counting is being conducted, normal memory traffic may be carried out in response to memory requests generated by other circuits (e.g., processor cores, etc.) coupled to the memory controller. This allows iterative delay adjustments with regard to the corresponding clock signal such that it is able to track the voltage as it changes. These iterations continue until the supply voltage reaches the value of the second performance state, V_P2. At least one additional iteration may be carried out after the voltage is at V_P2 to get a final delay value. After the voltage has fully stabilized at the new value, a circuit such as power control circuit 320 of FIG. 3 may indicate to the memory controller that V_P2 is stable, after which the calibrations discussed herein may be discontinued.

Method Embodiments

Figure 5:
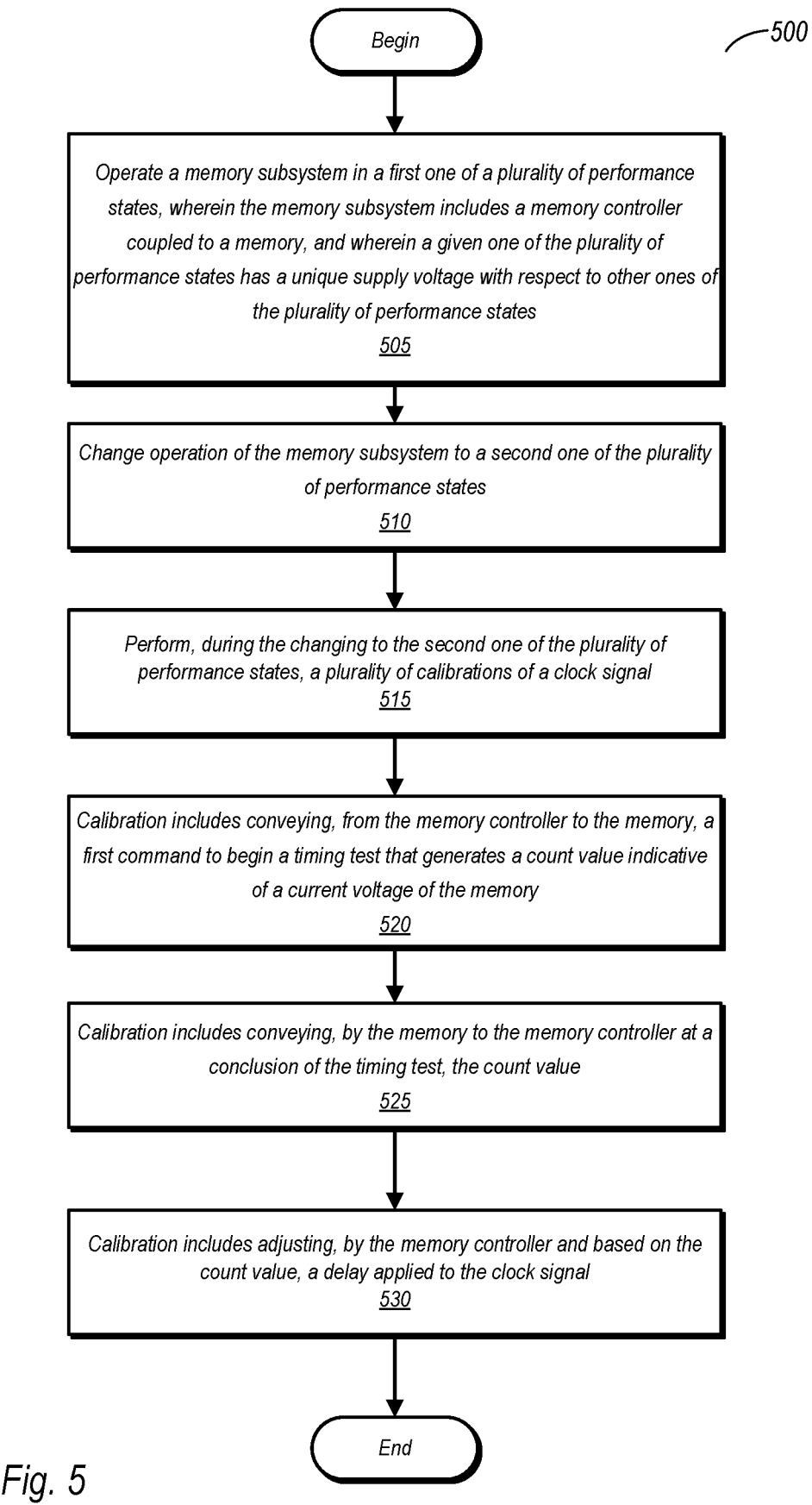
FIG. 5 is a flow diagram of one embodiment of a method for carrying out a calibration in a memory subsystem.

FIG. 5 is a flow diagram of one embodiment of a method for carrying out a calibration in a memory subsystem. Method 500 as discussed herein may be carried out by the various hardware/circuit embodiments discussed above. Embodiments of hardware/circuitry not explicitly discussed herein but otherwise capable of carrying out Method 500 are also considered to fall within the scope of this disclosure.

Method 500 includes operating a memory subsystem in a first one of a plurality of performance states, wherein the memory subsystem includes a memory controller circuit coupled to a memory, and wherein a given one of the plurality of performance states has a unique supply voltage with respect to other ones of the plurality of performance states (block 505). The method further includes changing operation of the memory subsystem to a second one of the plurality of performance states (block 510), and performing, during the changing operation to the second one of the plurality of performance states, a plurality of calibrations of a clock signal conveyed from the memory controller circuit to the memory, (block 515). A given one of the plurality of calibrations includes conveying, by the memory controller circuit to the memory, a first command to begin a timing test that generates a count value indicative of a current voltage of the memory (block 520), conveying, by the memory to the memory controller circuit at a conclusion of the timing test, the count value (block 525), and adjusting, by the memory controller circuit and based on the count value, a delay applied to the clock signal (block 530).

In various embodiments a given iteration of the calibration includes incrementing a counter circuit, using a ring oscillator, to generate the count value and conveying the count value from the counter circuit. The given iteration may also include conveying a second command, by the memory controller circuit to the memory, after a particular time interval subsequent to conveying the first command. Thereafter, the given iteration includes discontinuing incrementing the counter circuit in response to the memory receiving the second command, conveying the count value from the counter to the memory controller circuit and resetting the count value to zero.

In one embodiment, the method includes increasing a frequency of an output signal from the ring oscillator in response to increasing a supply voltage during the change of from the first one of a plurality of performance states to the second one of the plurality of performance states.

Embodiments of the method may also include the memory controller circuit adjusting the delay applied to the clock signal based on a difference between the count value and a previous count value. Embodiments may also include discontinuing performing the plurality of calibrations in response to a supply voltage stabilizing at a value specified by the second one of the plurality of performance states. In various embodiments, the method also includes conveying memory traffic between the memory controller circuit and the memory during at least a portion of the change from the first one of a plurality of performance states to the second one of the plurality of performance states.

Figure 6:
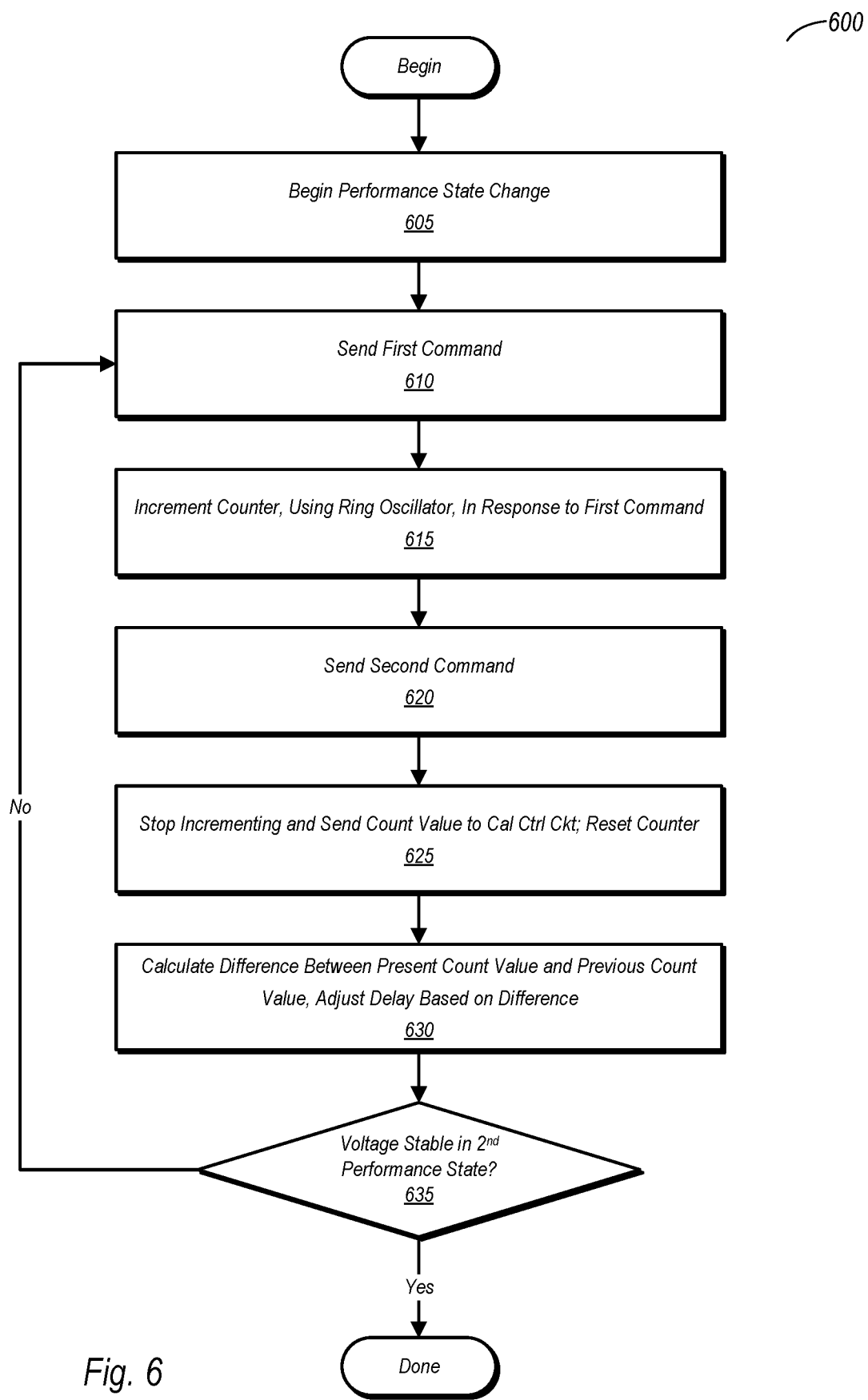
FIG. 6 is a flow diagram of another embodiment of a method for carrying out a calibration in a memory subsystem.
Figure 7:
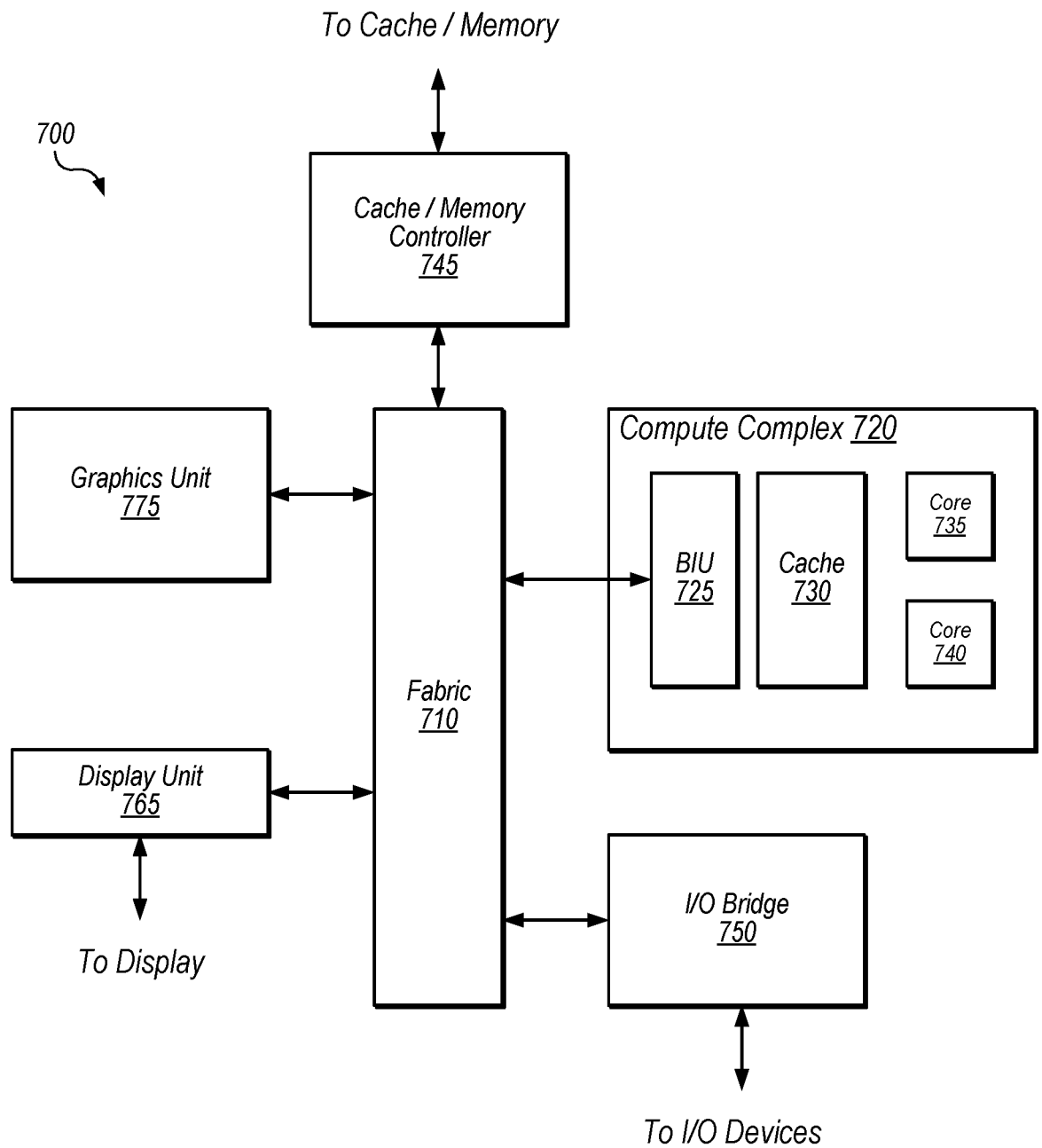
FIG. 7 is a block diagram of one embodiment of an example device.

FIG. 6 is a flow diagram of another embodiment of a method for carrying out a calibration in a memory subsystem. Method 600 may be carried out by any of the hardware/circuit embodiments discussed above. A hardware/circuit embodiment capable of performing Method 600, but not otherwise disclosed herein, is also considered to fall within the scope of this disclosure.

Method 600 commences with the beginning of a performance state change (block 605). The changing of the performance state as defined herein includes a change of a supply voltage provided to a memory subsystem that includes a memory controller and a memory. In carrying out the change, the voltage may be ramped up or down, depending on the supply voltage corresponding to the target performance state.

Upon beginning the performance state change, an iteration of the calibration begins with the sending of a first command (block 610) from a memory controller to a memory. On the memory side, a counter and a ring oscillator may be implemented, with the output signal of the ring oscillator being used to increment the counter. The ring oscillator may be of a design, such as an odd-numbered loop of serially-coupled CMOS inverters, in which the output frequency varies with the voltage.

In response to receiving the first command, the counter may begin incrementing using the output signal of the ring oscillator (block 615). This incrementing may continue until the sending of a second command (block 620). In response to receiving the second command, the counter may discontinue incrementing, send the accumulated count value back to the memory controller, and reset its value to zero (block 625). Upon receiving the current count value, circuitry in the memory controller may calculate a difference between the current count value and a most recent previous count value, and carry out an adjustment of the delay applied to a clock signal based on this difference (block 630).

If the voltage has not yet stabilized at the value of the second (target) performance state (block 635, no), Method 600 returns to block 610 and repeats the process. This may occur a number of times as the supply voltage changes from that of the first performance state to that of the second performance state. During at least the portions of the calibration in which the count value is being incremented, normal memory transactions based on memory requests from various circuits in the system may be carried out. When the voltage is finally stable at the value of the second performance state (block 635, yes), the calibrations may be discontinued, and Method 600 completes.

Example Device:

Referring now to FIG. 7, a block diagram illustrating an example embodiment of a device 700 is shown. In some embodiments, elements of device 700 may be included within a system on a chip. In some embodiments, device 700 may be included in a mobile device, which may be battery-powered. Therefore, power consumption by device 700 may be an important design consideration. In the illustrated embodiment, device 700 includes fabric 710, compute complex 720 input/output (I/O) bridge 750, cache/memory controller 745, graphics unit 775, and display unit 765. In some embodiments, device 700 may include other components (not shown) in addition to or in place of the illustrated components, such as video processor encoders and decoders, image processing or recognition elements, computer vision elements, etc.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally.

In the illustrated embodiment, compute complex 720 includes bus interface unit (BIU) 725, cache 730, and cores 735 and 740. In various embodiments, compute complex 720 may include various numbers of processors, processor cores and caches. For example, compute complex 720 may include 1, 2, or 4 processor cores, or any other suitable number. In one embodiment, cache 730 is a set associative L2 cache. In some embodiments, cores 735 and 740 may include internal instruction and data caches. In some embodiments, a coherency unit (not shown) in fabric 710, cache 730, or elsewhere in device 700 may be configured to maintain coherency between various caches of device 700. BIU 725 may be configured to manage communication between compute complex 720 and other elements of device 700. Processor cores such as cores 735 and 740 may be configured to execute instructions of a particular instruction set architecture (ISA) which may include operating system instructions and user application instructions. These instructions may be stored in computer readable medium such as a memory coupled to memory controller 745 discussed below.

As used herein, the term "coupled to" may indicate one or more connections between elements, and a coupling may include intervening elements. For example, in FIG. 7, graphics unit 775 may be described as "coupled to" a memory through fabric 710 and cache/memory controller 745. In contrast, in the illustrated embodiment of FIG. 7, graphics unit 775 is "directly coupled" to fabric 710 because there are no intervening elements.

Cache/memory controller 745 may be configured to manage transfer of data between fabric 710 and one or more caches and memories. For example, cache/memory controller 745 may be coupled to an L3 cache, which may in turn be coupled to a system memory. In other embodiments, cache/memory controller 745 may be directly coupled to a memory. In some embodiments, cache/memory controller 745 may include one or more internal caches. Memory coupled to controller 745 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 745 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 720 to cause the computing device to perform functionality described herein.

In addition to the above, cache/memory controller may include circuitry such as that shown in FIGS. 1-3, and/or circuitry capable of carrying out the methods of FIGS. 4-6. This includes the ability to perform calibrations in the background while a change of supply voltage is ongoing in conjunction with a change from a first performance state to a second performance state. During at least a portion of these calibrations, which are described above, memory transactions may be carried out involving the various circuits in device 700 capable of generating memory requests.

Graphics unit 775 may include one or more processors, e.g., one or more graphics processing units (GPUs). Graphics unit 775 may receive graphics-oriented instructions, such as OPENGL®, Metal®, or DIRECT3D® instructions, for example. Graphics unit 775 may execute specialized GPU instructions or perform other operations based on the received graphics-oriented instructions. Graphics unit 775 may generally be configured to process large blocks of data in parallel and may build images in a frame buffer for output to a display, which may be included in the device or may be a separate device. Graphics unit 775 may include transform, lighting, triangle, and rendering engines in one or more graphics processing pipelines. Graphics unit 775 may output pixel information for display images. Graphics unit 775, in various embodiments, may include programmable shader circuitry which may include highly parallel execution cores configured to execute graphics programs, which may include pixel tasks, vertex tasks, and compute tasks (which may or may not be graphics-related).

Display unit 765 may be configured to read data from a frame buffer and provide a stream of pixel values for display. Display unit 765 may be configured as a display pipeline in some embodiments. Additionally, display unit 765 may be configured to blend multiple frames to produce an output frame. Further, display unit 765 may include one or more interfaces (e.g., MIPI® or embedded display port (eDP)) for coupling to a user display (e.g., a touchscreen or an external display).

I/O bridge 750 may include various elements configured to implement: universal serial bus (USB) communications, security, audio, and low-power always-on functionality, for example. I/O bridge 750 may also include interfaces such as pulse-width modulation (PWM), general-purpose input/output (GPIO), serial peripheral interface (SPI), and inter-integrated circuit (I2C), for example. Various types of peripherals and devices may be coupled to device 700 via I/O bridge 750.

In some embodiments, device 700 includes network interface circuitry (not explicitly shown), which may be connected to fabric 710 or I/O bridge 750. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 700 with connectivity to various types of other devices and networks.

Figure 8:
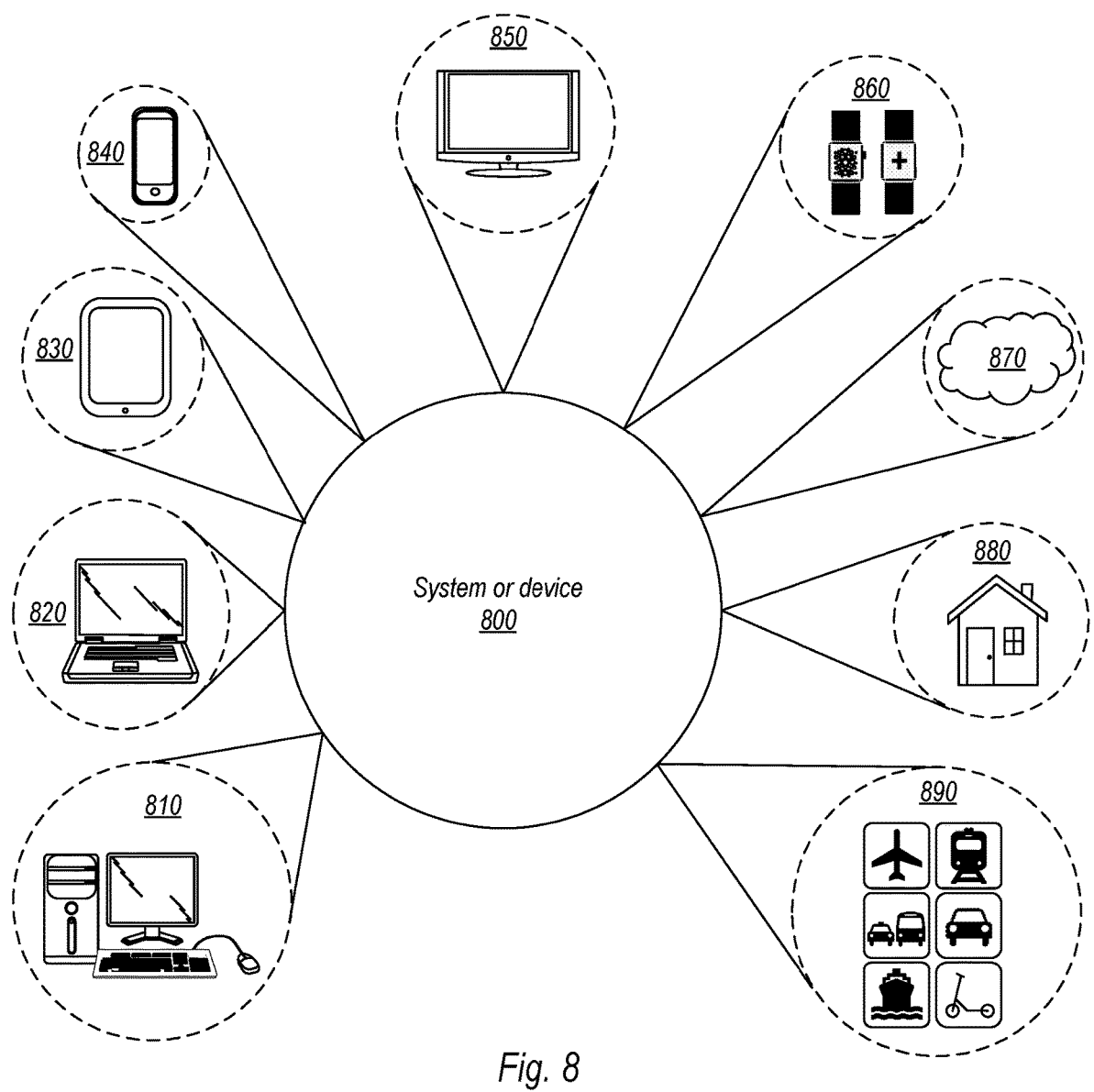
FIG. 8 is a diagram illustrating different applications of a system including a memory controller in accordance with the disclosure.

Example Applications:

Turning now to FIG. 8, various types of systems that may include any of the circuits, devices, or system discussed above. System or device 800, which may incorporate or otherwise utilize one or more of the techniques described herein, may be utilized in a wide range of areas. For example, system or device 800 may be utilized as part of the hardware of systems such as a desktop computer 810, laptop computer 820, tablet computer 830, cellular or mobile phone 840, or television 850 (or set-top box coupled to a television).

Similarly, disclosed elements may be utilized in a wearable device 860, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 800 may also be used in various other contexts. For example, system or device 800 may be utilized in the context of a server computer system, such as a dedicated server or on shared hardware that implements a cloud-based service 870. Still further, system or device 800 may be implemented in a wide range of specialized everyday devices, including devices 880 commonly found in the home such as refrigerators, thermostats, security cameras, etc. The interconnection of such devices is often referred to as the "Internet of Things" (IoT). Elements may also be implemented in various modes of transportation. For example, system or device 800 could be employed in the control systems, guidance systems, entertainment systems, etc. of various types of vehicles 890.

The applications illustrated in FIG. 8 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium:

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 9:
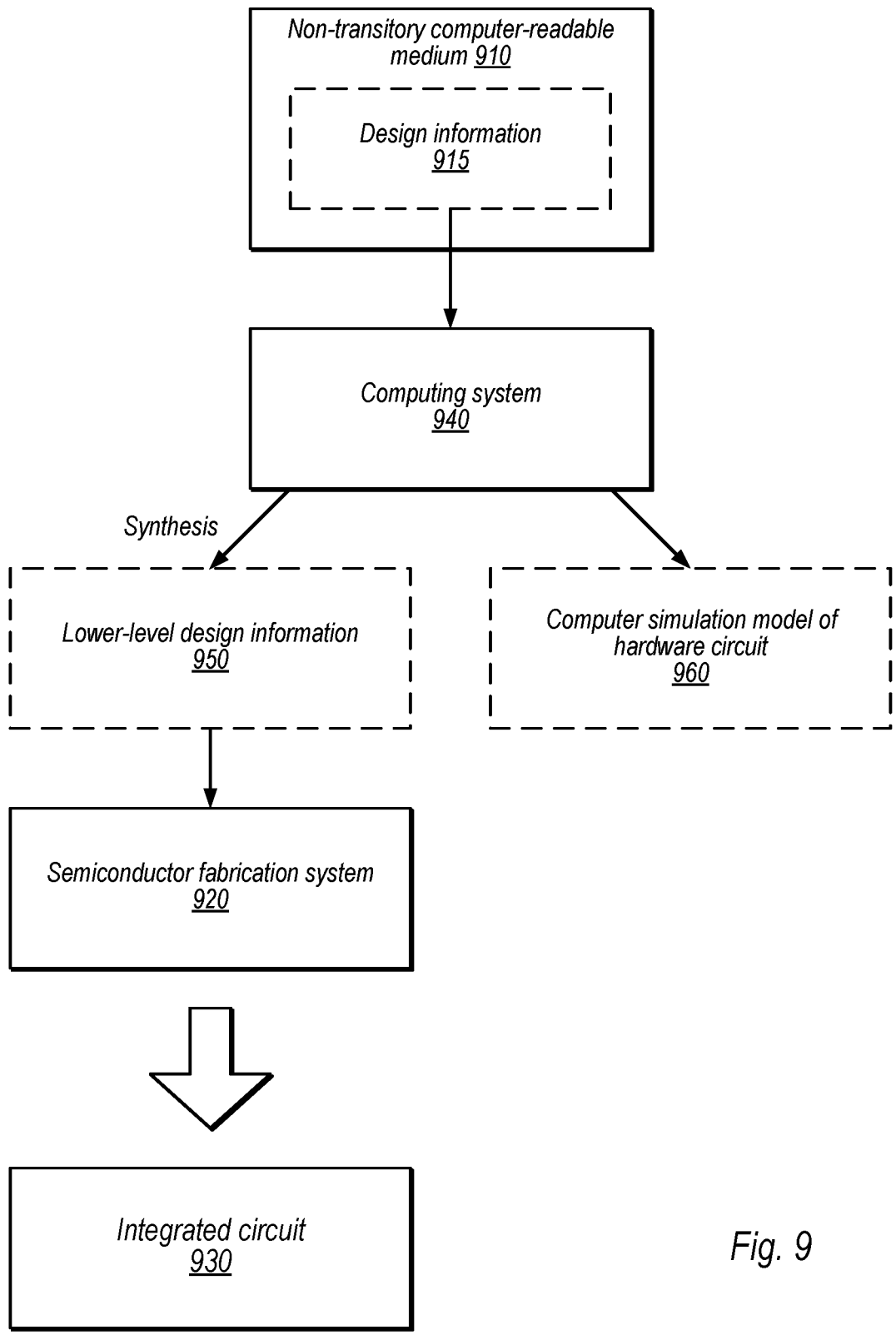
FIG. 9 is a block diagram of a computer readable medium and manufacturing system for fabricating a circuit according to the disclosure.

FIG. 9 is a block diagram illustrating an example non-transitory computer-readable storage medium that stores circuit design information, according to some embodiments. In the illustrated embodiment, computing system 940 is configured to process the design information. This may include executing instructions included in the design information, interpreting instructions included in the design information, compiling, transforming, or otherwise updating the design information, etc. Therefore, the design information controls computing system 940 (e.g., by programming computing system 940) to perform various operations discussed below, in some embodiments.

In the illustrated example, computing system 940 processes the design information to generate both a computer simulation model of a hardware circuit 960 and lower-level design information 950. In other embodiments, computing system 940 may generate only one of these outputs, may generate other outputs based on the design information, or both. Regarding the computing simulation, computing system 940 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 940 also processes the design information to generate lower-level design information 950 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 950 (potentially among other inputs), semiconductor fabrication system 920 is configured to fabricate an integrated circuit 930 (which may correspond to functionality of the simulation model 960). Note that computing system 940 may generate different simulation models based on design information at various levels of description, including information 950, 915, and so on. The data representing design information 950 and model 960 may be stored on medium 910 or on one or more other media.

In some embodiments, the lower-level design information 950 controls (e.g., programs) the semiconductor fabrication system 920 to fabricate the integrated circuit 930. Thus, when processed by the fabrication system, the design information may program the fabrication system to fabricate a circuit that includes various circuitry disclosed herein.

Non-transitory computer-readable storage medium 910, may comprise any of various appropriate types of memory devices or storage devices. Non-transitory computer-readable storage medium 910 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 910 may include other types of non-transitory memory as well or combinations thereof. Accordingly, non-transitory computer-readable storage medium 910 may include two or more memory media; such media may reside in different locations—for example, in different computer systems that are connected over a network.

Design information 915 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 940, semiconductor fabrication system 920, or both. In some embodiments, design information may also include one or more cell libraries that specify the synthesis, layout, or both of integrated circuit 930. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 930 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 and model 960 are configured to operate according to a circuit design specified by design information 915, which may include performing any of the functionality described herein. For example, integrated circuit 930 may include any of various elements shown in FIGS. 1-3, and/or circuits capable of carrying out the calibrations described in conjunction with FIGS. 4-6. Further, integrated circuit 930 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 920 to fabricate integrated circuit 930.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise")

is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus comprising:
a memory controller circuit, wherein the memory controller circuit is configured to convey a clock signal to a memory, wherein the memory controller circuit includes:
a calibration control circuit configured to perform a plurality of calibrations of the clock signal during a change from a first one of a plurality of performance states to a second one of the plurality of performance states; and
a delay circuit configured to apply a delay to and convey the clock signal to the memory;
wherein, in performing a given one of the plurality of calibrations, the calibration control circuit is configured to:
convey, to the memory, a first command to begin a timing test that generates a count value indicative of a current voltage of the memory;
receive the count value from the memory at a conclusion of the timing test; and
cause the delay circuit to adjust, based on the count value, the delay applied to the clock signal.

2. The apparatus of claim 1, wherein the memory controller circuit is part of a memory subsystem that includes the memory, wherein the memory includes:
a plurality of storage locations;
a counter circuit; and
a ring oscillator, wherein, in response to receiving the first command, the counter is configured to increment using an output signal generated by the ring oscillator.

3. The apparatus of claim 2, wherein the calibration control circuit is further configured to, after a particular time interval subsequent to conveying the first command, convey a second command to the memory, wherein the counter circuit is configured to:
discontinue incrementing in response to receiving the second command;
convey the count value to the calibration control circuit; and
reset the count value to zero.

4. The apparatus of claim 2, wherein the ring oscillator is configured to increase a frequency of a correspondingly generated output signal in response to an increase in a supply voltage during the change from the first one of a plurality of performance states to the second one of the plurality of performance states.

5. The apparatus of claim 1, wherein the calibration control circuit is configured to cause the delay circuit to adjust the delay applied to the clock signal based on a difference between the count value and a previous count value.

6. The apparatus of claim 1, wherein the calibration control circuit is configured to discontinue performing the plurality of calibrations in response to a supply voltage stabilizing at a value specified by the second one of the plurality of performance states.

7. The apparatus of claim 1, wherein a given one of the plurality of performance states has a unique supply voltage with respect to other ones of the plurality of performance states.

8. The apparatus of claim 1, wherein the memory controller circuit is configured to convey and receive memory traffic to and from the memory during at least a portion of the change from the first one of a plurality of performance states to the second one of the plurality of performance states.

9. The apparatus of claim 1, wherein the delay circuit comprises a delay locked loop (DLL).

10. A method comprising:
operating a memory subsystem in a first one of a plurality of performance states, wherein the memory subsystem includes a memory controller circuit coupled to a memory, and wherein a given one of the plurality of performance states has a unique supply voltage with respect to other ones of the plurality of performance states;
changing operation of the memory subsystem to a second one of the plurality of performance states;
performing, during the changing operation to the second one of the plurality of performance states, a plurality of calibrations of a clock signal conveyed from the memory controller circuit to the memory, wherein a given one of the plurality of calibrations comprises:
conveying, by the memory controller circuit to the memory, a first command to begin a timing test that generates a count value indicative of a current voltage of the memory;
conveying, by the memory to the memory controller circuit at a conclusion of the timing test, the count value; and
adjusting, by the memory controller circuit and based on the count value, a delay applied to the clock signal.

11. The method of claim 10, further comprising:
incrementing a counter circuit, using a ring oscillator, to generate the count value; and
conveying the count value from the counter circuit.

12. The method of claim 11, further comprising:
conveying a second command, by the memory controller circuit to the memory, after a particular time interval subsequent to conveying the first command;
discontinuing incrementing the counter circuit in response to the memory receiving the second command;
conveying the count value from the counter circuit to the memory controller circuit; and
resetting the count value to zero.

13. The method of claim 11, further comprising increasing a frequency of an output signal from the ring oscillator in response to increasing a supply voltage during the changing of from the first one of a plurality of performance states to the second one of the plurality of performance states.

14. The method of claim 10, further comprising the memory controller circuit adjusting the delay applied to the clock signal based on a difference between the count value and a previous count value.

15. The method of claim 10, further comprising discontinuing performing the plurality of calibrations in response to a supply voltage stabilizing at a value specified by the second one of the plurality of performance states.

16. The method of claim 10, further comprising conveying memory traffic between the memory controller circuit and the memory during at least a portion of changing operation of the memory subsystem to the second one of the plurality of performance states.

17. A system comprising:
an integrated circuit including at least one memory controller circuit implemented thereon, wherein the memory controller circuit is configured to operate in one of a plurality of performance states, and wherein the at least one memory controller circuit includes:
a calibration control circuit configured to perform a plurality of calibrations of a clock signal conveyed from the memory controller circuit to a memory during a change of operation from a first one of the plurality of performance states to a second one of the plurality of performance states, wherein the change of operation comprises a change to a supply voltage; and a delay circuit configured to apply a delay to the clock signal and further configured to convey the clock signal from the memory controller circuit;

wherein, in performing a given one of the plurality of calibrations, the calibration control circuit is configured to:

convey a first command from the memory controller circuit to cause initiation of a timing test that generates a count value indicative of a value of the supply voltage;

receive the count value subsequent to conclusion of the timing test; and cause the delay circuit to adjust the delay to the clock signal using the count value.

18. The system of claim 17, further comprising a memory subsystem that includes the memory controller circuit and the memory, wherein the memory includes:

a ring oscillator circuit configured to generate an output signal, wherein a frequency of the output signal is dependent upon a value of the supply voltage; and a counter circuit coupled to receive the first command and the output signal, and wherein the counter circuit is configured to, in response to receiving the first command, begin incrementing the count value using the output signal.

19. The system of claim 18, wherein the calibration control circuit is configured to, after a particular time interval, convey a second command to the memory subsequent to conveying the first command, wherein in response to receiving the second command, the counter circuit is configured to:

discontinue incrementing the count value;

send the count value to the calibration control circuit; and reset the count value to zero; and wherein the calibration control circuit is configured to, in response to receiving the count value:

calculate a difference between the count value and a most recent previous count value; and adjust the delay provided by the delay circuit using the difference.

20. The system of claim 17, wherein the memory controller circuit is configured to send and receive memory transactions to and from the memory during at least a portion of the change from the first one of a plurality of performance states to the second one of the plurality of performance states.

* * * * *